(12) United States Patent
Byun et al.

(10) Patent No.: US 8,263,255 B2
(45) Date of Patent: Sep. 11, 2012

(54) RECHARGEABLE BATTERY AND BATTERY MODULE

(75) Inventors: Sang-Won Byun, Suwon-si (KR); Sung-Bae Kim, Suwon-si (KR)

(73) Assignee: SB LiMotive Co., Ltd., Suwon-si, Gyeonggi-do (KR)

( * ) Notice: Subject to any disclaimer, the term of this patent is extended or adjusted under 35 U.S.C. 154(b) by 26 days.

(21) Appl. No.: 12/654,990

(22) Filed: Jan. 12, 2010

(65) Prior Publication Data
US 2011/0081572 A1 Apr. 7, 2011

Related U.S. Application Data

(60) Provisional application No. 61/272,511, filed on Oct. 1, 2009.

(51) Int. Cl.
*H01M 2/02* (2006.01)
*H01M 2/24* (2006.01)
*H01M 6/42* (2006.01)

(52) U.S. Cl. ......... 429/178; 429/181; 429/158; 429/160

(58) Field of Classification Search .................. 429/178, 429/181, 158, 160
See application file for complete search history.

(56) References Cited

U.S. PATENT DOCUMENTS

| | | | | |
|---|---|---|---|---|
| 4,792,503 A | * | 12/1988 | Eppley | 429/181 |
| 2003/0143460 A1 | * | 7/2003 | Yoshida et al. | 429/181 |
| 2004/0023108 A1 | * | 2/2004 | Nakanishi et al. | 429/178 |
| 2007/0160904 A1 | * | 7/2007 | Uh | 429/174 |
| 2008/0063929 A1 | * | 3/2008 | Byun et al. | 429/121 |
| 2010/0233527 A1 | | 9/2010 | Meschter et al. | |

FOREIGN PATENT DOCUMENTS

| | | |
|---|---|---|
| JP | 63-158739 A | 7/1988 |
| JP | 2000-113865 A | 4/2000 |
| JP | 2005-032477 A | 2/2005 |
| KR | 10-2006-0111834 A | 10/2006 |
| KR | 10-2007-0107921 A | 11/2007 |
| WO | WO 2006/008812 A1 | 1/2006 |
| WO | WO 2006/085914 A2 | 8/2006 |

OTHER PUBLICATIONS

Glossary of Battery Terms (cathode), Feb. 15, 2011: www.greenbatteries.com/batteryterms.html.*
European Search Report in EP 10177774.6-2119, dated Dec. 6, 2010 (Byun, et al.), European Office Action from prosecution of corresponding European application.
European Office Action in EP 10177774.6-2119, dated Jun. 30, 2011 (Byun, et al.).

* cited by examiner

*Primary Examiner* — Eugenia Wang
(74) *Attorney, Agent, or Firm* — Lee & Morse, P.C.

(57) ABSTRACT

A battery includes a battery case, an electrode assembly in the battery case, the electrode assembly including a first electrode, a first terminal exposed to an exterior of the battery case, the first terminal being electrically connected to the first electrode, a first fixing member mechanically coupling the first terminal to the battery, the first fixing member forming at least part of an electrical path from the first terminal to the first electrode, and a corrosion resistance member providing an electrical path from the first terminal to the first fixing member and being in direct contact with each of the first terminal and the first fixing member.

24 Claims, 5 Drawing Sheets

RECHARGEABLE BATTERY AND BATTERY MODULE

CROSS-REFERENCE TO RELATED APPLICATION

This application claims priority to U.S. Provisional Application No. 61/272,511, filed in the U.S. Patent and Trademark Office on Oct. 1, 2009, and entitled "RECHARGEABLE BATTERY AND BATTERY MODULE," which is incorporated by reference herein in its entirety and for all purposes.

BACKGROUND

1. Field of the Invention

Embodiments relate to a rechargeable battery and a battery module.

2. Description of the Related Art

A rechargeable battery differs from a primary battery in that it can be repeatedly charged and discharged, while the latter makes only the irreversible conversion of chemical to electrical energy. The low-capacity rechargeable battery is used as the power supply for small electronic devices, such as cellular phones, notebook computers and camcorders, while the high-capacity rechargeable battery is used as the power supply for driving motors in hybrid vehicles and the like.

A high-power rechargeable battery using a non-aqueous electrolyte with a high energy density has been recently developed. For example, the high-power rechargeable battery is constructed with a high-capacity rechargeable battery having a plurality of rechargeable cells coupled to each other in series such that it can be used as the power supply for driving motors in electric vehicles requiring high power.

The above information disclosed in this Background section is only for enhancement of understanding of the related art and may contain information that does not form the prior art that is already known in this country to a person of ordinary skill in the art.

SUMMARY

Embodiments are therefore directed to a rechargeable battery and a battery module, which substantially overcome one or more of the problems due to the limitations and disadvantages of the related art.

It is therefore a feature of an embodiment to provide a rechargeable battery with an improved terminal structure, and a battery module including the same.

It is therefore another feature of an embodiment to provide a rechargeable battery that includes provisions for preventing galvanic corrosion, and a battery module including the same.

At least one of the above and other features may be realized by providing a battery, including a battery case, an electrode assembly in the battery case, the electrode assembly including a first electrode, a first terminal exposed to an exterior of the battery case, the first terminal being electrically connected to the first electrode, a first fixing member mechanically coupling the first terminal to the battery, the first fixing member forming at least part of an electrical path from the first terminal to the first electrode, and a corrosion resistance member providing an electrical path from the first terminal to the first fixing member and being in direct contact with each of the first terminal and the first fixing member.

The corrosion resistance member may prevent the first terminal from directly contacting the first fixing member.

The first terminal may have a surface formed of a metal having a first ionization tendency, the first fixing member may have a surface formed of a metal having a second ionization tendency, and the corrosion resistance member may have a surface formed of a metal having a third ionization tendency that is between the first ionization tendency and the second ionization tendency.

The first terminal may serve as the positive terminal.

The first terminal may serve as the cathode terminal during discharge of the battery.

The metal forming the surface of the first terminal may be copper, and the metal forming the surface of the first fixing member may be aluminum.

The first electrode may include aluminum, and the first fixing member may electrically contact the first electrode.

The metal forming the surface of the corrosion resistance member may be nickel, stainless steel, nickel-plated copper, or a clad metal of Al—Cu, Ni—Cu, or Al—Ni.

The first terminal may serve as the negative terminal.

The first terminal may serve as the anode terminal during discharge of the battery.

The metal forming the surface of the first terminal may be aluminum, and the metal forming the surface of the first fixing member may be copper.

The first electrode may include copper, and the first fixing member may electrically contact the first electrode.

The metal forming the surface of the corrosion resistance member may be nickel, stainless steel, nickel-plated copper, or a clad metal of Al—Cu, Ni—Cu, or Al—Ni.

The corrosion resistance member may be separate from the first terminal and the first fixing member.

The corrosion resistance member may be integral with the first terminal.

The corrosion resistance member may be a layer deposited on the first terminal.

The corrosion resistance member may be a plating layer on the first terminal.

The electrode assembly may further include a second electrode and a separator, the separator separating the first electrode from the second electrode.

The first fixing member may be a rivet.

At least one of the above and other features may also be realized by providing a battery module, including a first battery, and a second battery electrically connected to the first battery, each of the first and second batteries including a battery case, an electrode assembly in the battery case, the electrode assembly including a first electrode, a first terminal exposed to an exterior of the battery case, the first terminal being electrically connected to the first electrode, a first fixing member mechanically coupling the first terminal to the battery, the first fixing member forming at least part of an electrical path from the first terminal to the first electrode, and a corrosion resistance member providing an electrical path from the first terminal to the first fixing member and being in direct contact with each of the first terminal and the first fixing member.

The corrosion resistance member may prevent the first terminal from directly contacting the first fixing member.

The first battery and the second battery may be electrically connected to one another in series, the first terminals of the respective first and second batteries serving as positive terminals, and the positive terminal of the first battery may be electrically connected to a negative terminal of the second battery by a connection member that is welded to each of the positive terminal of the first battery and the negative terminal of the second battery.

Outer surfaces of the positive terminal of the first battery, the negative terminal of the second battery, and the connection member may each be formed of a same metal.

The first fixing member may be a rivet, the rivet having an outer surface formed of a metal different from an outer surface of the positive terminal.

BRIEF DESCRIPTION OF THE DRAWINGS

The above and other features and advantages will become more apparent to those of ordinary skill in the art by describing in detail example embodiments with reference to the attached drawings, in which.

DESCRIPTION OF REFERENCE NUMERALS INDICATING ELEMENTS IN THE DRAWINGS

Figure 1:
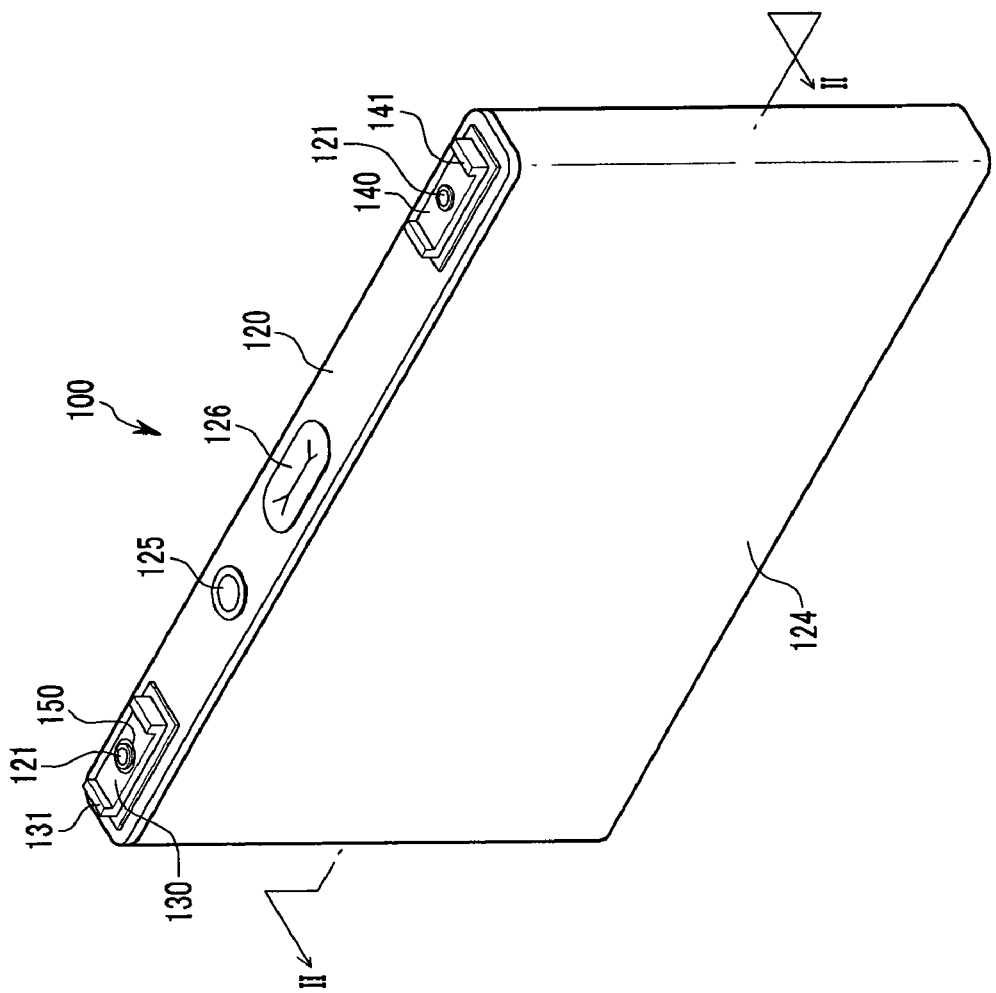
FIG. 1 illustrates a perspective view of a rechargeable battery according to a first example embodiment.

100: rechargeable battery,
110: electrode assembly,
111: positive electrode,
111a: positive electrode uncoated region,
112: negative electrode,
112a: negative electrode uncoated region,
113: separator,
115: first lead member,
115a: first lead member upper plate,
115b: first lead member attachment plate,
116: second lead member,
120: cap plate,
121: first fixture (rivet),
121a: first fixture pillar portion,
121b: first fixture top head portion,
121c: first fixture bottom head portion,
122: second fixture (rivet),
122a: second fixture pillar portion,
122b: second fixture top head portion,
122c: second fixture bottom head portion,
123: terminal insulating member,
124: case,
125: electrolyte injection hole plug (cork),
126: vent,
127: lower gasket,
130: first terminal (positive terminal),
140: second terminal (negative terminal),
131: protrusion,
132: first hole,
134: second hole,
141: protrusion,
150: corrosion resistance member,
151: corrosion resistance member tube portion,
153: corrosion resistance member head portion,
156: corrosion resistance member hole,
160: connection member,
162: connection member groove,
165: welded portion,
175: welded portion,
180: first terminal (positive terminal),
181: first terminal protrusions, and
185: corrosion resistance layer.

DETAILED DESCRIPTION

Example embodiments will now be described more fully hereinafter with reference to the accompanying drawings, however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, dimensions may be exaggerated for clarity of illustration. It will be understood that when an element is referred to as being "on" another element, it can be directly on the other element, or one or more intervening elements may also be present. It will also be understood that when an element is referred to as being "under" another element, it can be directly under, or one or more intervening elements may also be present. It will also be understood that when an element is referred to as being "between" two elements, it can be the only element between the two elements, or one or more intervening elements may also be present. Like reference numerals refer to like elements throughout.

As used herein, the term "anode" refers to the electrode at which oxidation occurs. As used herein, the term "cathode" refers to the electrode at which reduction occurs. The terminal that is coupled to the anode ("anode terminal") is the negative terminal (−) of the electrochemical cell (or unit battery) while the electrochemical cell is discharging. The anode terminal provides electrons to the load circuit during discharge of the electrochemical cell. The terminal that is coupled to the cathode is the positive terminal (+) of the electrochemical cell while the electrochemical cell is discharging. The cathode terminal receives electrons from the load circuit during discharge of the electrochemical cell. While the battery is being charged, energy is input to the battery to regenerate the electrochemical potential of the battery. Thus, the oxidation and reduction locations interchange (or swap), such that the positive terminal of the electrochemical cell is the anode while the battery is being charged and the negative terminal of the electrochemical cell is the cathode while the battery is being charged.

Figure 2:
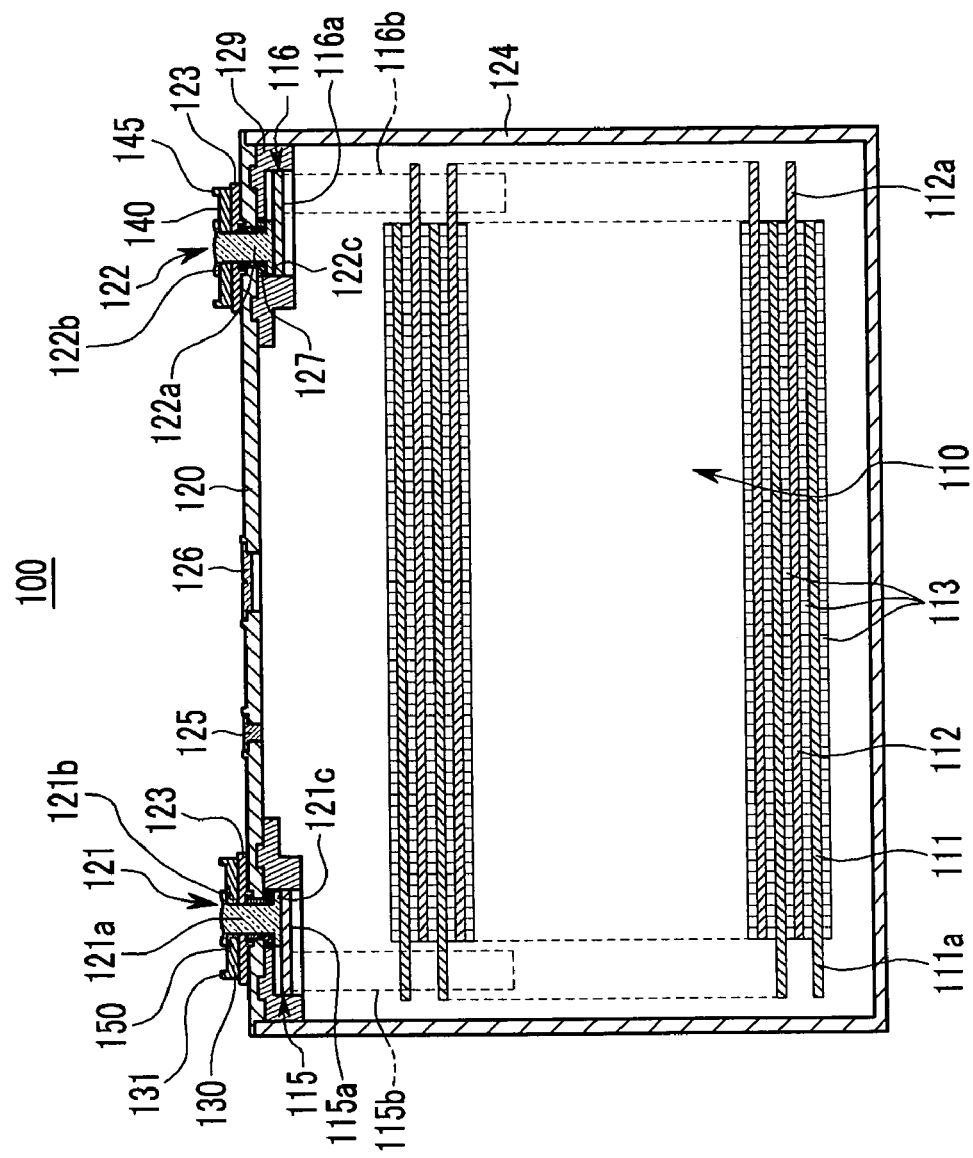
FIG. 2 illustrates a cross-sectional view of the rechargeable battery taken along the II-II line of FIG. 1.

FIG. 1 illustrates a perspective view of a rechargeable battery according to a first example embodiment, and FIG. 2 illustrates a cross-sectional view of the rechargeable battery taken along the II-II line of FIG. 1.

Referring to FIG. 1 and FIG. 2, the rechargeable battery 100 may be a prismatic battery. The rechargeable battery 100 may include an electrode assembly 110. The electrode assembly 110 may include positive and negative electrodes 111 and 112 wound together with a separator 113 interposed therebetween as an insulator. The rechargeable battery 100 may also include a case 124 having the electrode assembly 110 therein, first and second terminals 130 and 140 electrically connected to the electrode assembly 110, and a cap plate 120 fitted to an opening of the case 124 (the opening not being shown in the drawings, which illustrate the case 124 as being closed by the cap plate 120). As described in greater detail below, terminals may be electrically connected to the electrode assembly 110 and protruded to the outside of the case 124.

The positive electrode 111 may include a current collector, e.g., a thin metal foil plate, and a positive active material. The positive electrode 111 may include a coated region, where the positive active material is coated, and an uncoated region 111a, where active material is not coated. The thin metal foil plate of the positive electrode 111 may be aluminum or may include aluminum. The negative electrode 112 may include a current collector, e.g., a thin metal foil plate, and a negative active material. The negative electrode 112 may include a coated region, where the negative active material is coated, and an uncoated region 112a, where active material is not coated. The uncoated regions 111a and 112a may be formed at the lateral ends of the positive and the negative electrodes 111 and 112 in the longitudinal direction of the positive and the negative electrodes 111 and 112. The positive and the negative electrodes 111 and 112 may be spiral-wound by interposing the separator 113 therebetween as an insulator so as to form a jellyroll-shaped electrode assembly 110.

In another implementation, the electrode assembly 110 may be structured such that a plurality of positive and negative electrodes 111 and 112 are alternately deposited while interposing the separator 113 therebetween.

A first terminal 130 may be electrically connected to the positive uncoated region 111a of the electrode assembly 110 via a first lead member 115, and a second terminal 140 may be electrically connected to the negative uncoated region 112a via a second lead member 116.

The case 124 may be formed to have a hexahedral-shaped prismatic case having an inner space and the top opening. In another implementation, the case may be formed with various shapes such as a cylinder, a pouch, etc.

The case 124 may be formed to have a hexahedral-shaped prismatic case having an inner space and the top opening 124a. In another implementation, the case may be formed with various shapes such as a cylinder, a pouch, etc.

The cap plate 120 may be formed with a thin plate, and may be provided with a vent 126 having a notch capable of opening at a predetermined inner pressure. A plug 125 may be provided for sealing an electrolyte injection hole.

The first and the second terminals 130 and 140 may be plate-shaped, and may be disposed parallel to the cap plate 120. The first terminal 130 may be fixed to the cap plate 120 by way of a first fixture 121, and the second terminal 140 may be fixed to the cap plate 120 by way of a second fixture 122. In an implementation, the fixtures 121 and 122 may be formed with rivets. By using the fixtures 121 and 122, the first and second terminals 130, 140 may be secured against vibration and loosening, which may increase contact resistance. In contrast, where terminals are fixed to a cap plate by way of nuts, the nuts may be liable to release due to continuous external vibration or impact. If the nuts are released, the contact resistance between the electrode assembly and the terminals may increase so that the output of the rechargeable battery is deteriorated, and the cycle life of a battery module is reduced.

The fixtures 121 and 122 may have pillar portions 121a and 122a inserted into the cap plate 120, top head portions 121b and 122b laterally protruding from the top ends of the pillar portions 121a and 122a, and bottom head portions 121c and 122c laterally protruding from the bottom ends of the pillar portions 121a and 122a.

A first lead member 115 may be attached, e.g., by welding, to the bottom side of the bottom head portion 121c positioned at the bottom end of the first fixture 121. The first lead member 115 may be, or may include, aluminum. Similarly, the first fixture 121 may be, or may include, aluminum. The first lead member 115 may have an upper plate 115a welded to the first fixture 121, and an attachment plate 115b protruding downward from the upper plate 115a and fixed to the positive uncoated region 111a.

A second lead member 116 may be attached, e.g., by welding, to the bottom side of the bottom head portion 122c positioned at the bottom end of the second fixture 122. The second lead member 116 may be, or may include, copper. Similarly, the second fixture 122 may be, or may include, copper. The second lead member 116 may include an upper plate 116a welded to the second fixture 122, and an attachment plate 116b protruding downward from the upper plate 116a and fixed to the negative uncoated region 112a.

In another implementation, the lead members 115 and 116 may be fixed to the cap plate 120, together with the terminals 130 and 140, by way of the fixtures 121 and 122, rather than being welded to the fixtures.

Respective terminal insulating members 123 may be installed between the cap plate 120 and the terminals 130 and 140 so as to insulate the cap plate 120 from the terminals 130, 140. Respective lower gaskets 127 may be disposed between the cap plate 120 and the fixtures 121 and 122 so as to insulate the cap plate 120 from the fixtures 121 and 122.

The terminal insulating member 123 may be wider than the terminals 130 and 140, and may be tightly adhered to the top surface of the cap plate 120. The terminal insulating members 123 may have central through-holes for receiving the fixtures 121 and 122.

The terminals 130 and 140 of the rechargeable battery 100 according to the present example embodiment may be fixed to the cap plate 120 by way of the rivet-shaped fixtures 121 and 122, which may endure under vibration better than a nut-coupled structure.

Figure 3:
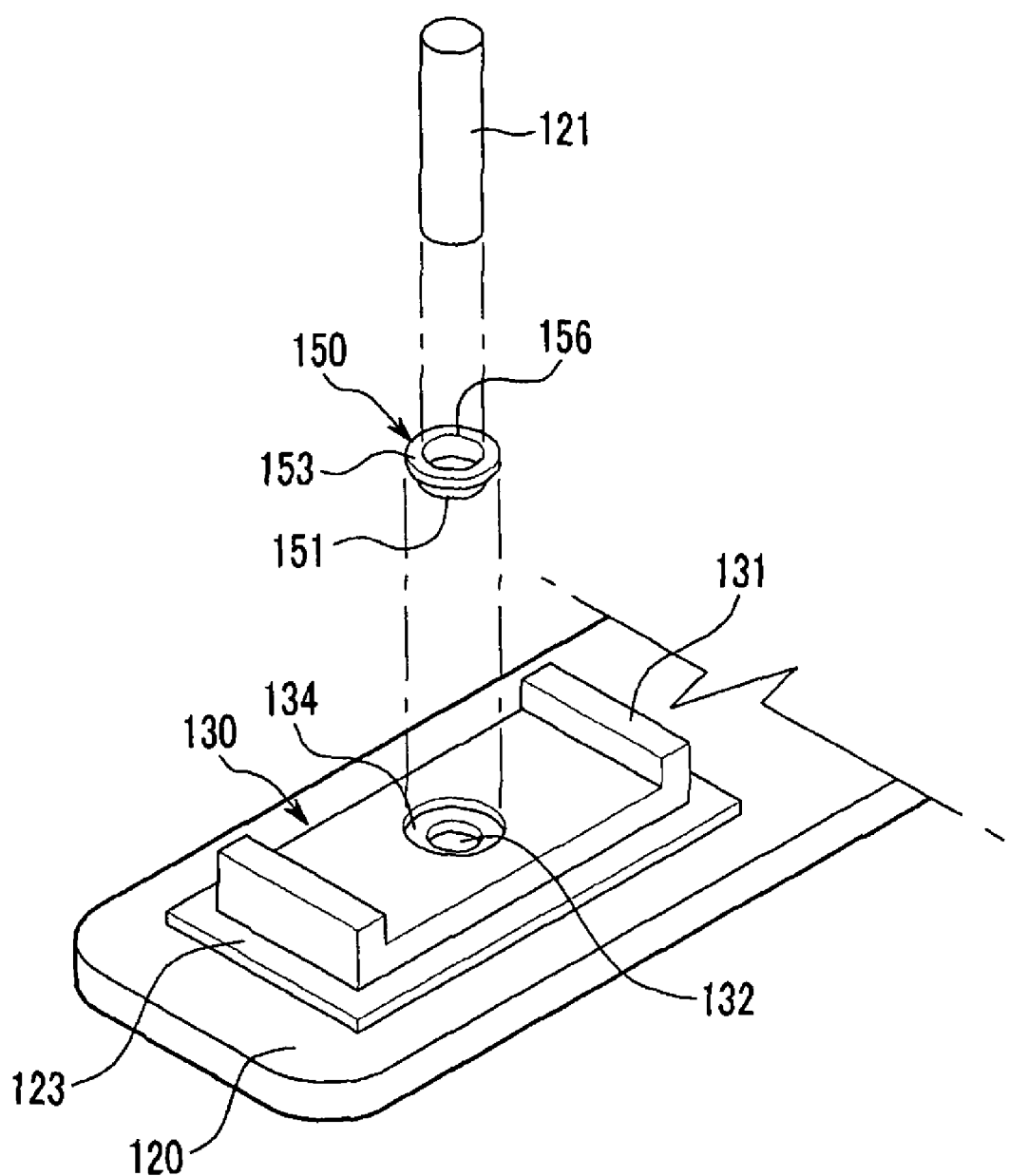
FIG. 3 illustrates an exploded perspective view of the rechargeable battery according to the first example embodiment, illustrating the process of installing a fixture at a first terminal.

FIG. 3 illustrates an exploded perspective view of the rechargeable battery according to the first example embodiment, illustrating the process of installing a fixture at a first terminal.

An example of installation of the first fixture 121 (and the second fixture 122, which may be installed in substantially the same manner) will now be described with reference to FIG. 2 and FIG. 3. As shown in FIG. 3, the pillar-shaped fixture 121 (122) may be inserted into the terminal 130 (140) and the cap plate 120. In this state, the fixture 121 (122) may be pressed from the top and the bottom ends so that top head portion 121b (122b) and bottom head portion 121c (122c) are formed by deforming the pillar shaped fixture 121 (122). In another implementation, a fixture with a pre-formed bottom head portion may be inserted into a terminal and cap plate, and the top end of the fixture may be pressed from the top end so as to form a top head portion at the top end of the rivet.

The terminals 130 and 140 may be tightly adhered to the cap plate 120 during the process of pressing the fixtures 121 and 122 so that the terminals 130 and 140 can be prevented from being released due to vibration.

It is most important with the rechargeable battery 100 to reduce the contact resistance. Excessively high contact resistance may degrade the output of the rechargeable battery 100, and may generate resistance heating from high current flow so that the temperature of the rechargeable battery 100 is elevated. When the temperature of the rechargeable battery 100 is elevated, an abnormal reaction may occur internally, and, accordingly, the cycle life of the rechargeable battery 100 may be reduced. However, with the present example embodiment, the fixtures 121 and 122 may be less susceptible to being loosened by vibration, and, hence, the contact resistance may be minimized.

As shown in FIG. 1, the first and the second terminals 130 and 140 may be generally formed in the shape of a rectangular plate, which has a short side with a relatively small length, and a long side with a length greater than the short sides.

Upward protrusions 131 and 141 may be formed at both ends of the long side, respectively, and a connection member 160 (described in detail below) may be fitted between the protrusions 131 and 141.

The first and the second terminals 130 and 140 may be formed with the same material. The first and second terminals 130, 140 may be, or may include, copper. The rechargeable battery 100 may be a lithium battery, a lithium ion battery, etc. In an embodiment, the positive current collector, the first lead member 115, and the first fixture 121 may be, or may include, aluminum. The negative current collector, the second lead member 116 and the second fixture 122 may be, or may include, copper.

As described in detail below, the rechargeable battery 100 according to an embodiment may reduce or eliminate galvanic corrosion. In this regard, where the first and the second terminals 130 and 140 are formed with copper, galvanic corrosion may be generated between the copper first terminal 130 and the first fixture 121, which may be, or may include, aluminum. Meanwhile, if the first and the second terminals 130 and 140 are formed with aluminum, galvanic corrosion may be made between the second terminal 140 and the second fixture 122, which may be, or may include, copper. Moreover, the galvanic corrosion between dissimilar metals may be further worsened when the potential difference is large, and the copper metal having a low ionization tendency is used as the negative electrode 112, while the aluminum metal having a high ionization tendency is used as the positive electrode 111. As copper and aluminum are largely differentiated in ionization tendency from each other, the possibility of galvanic corrosion is increased at the aluminum metal.

If galvanic corrosion is made between the terminals 130 and 140 and the fixtures 121 and 122, the contact resistance between the terminals 130 and 140 and the fixtures 121 and 122 may increase. Accordingly, the output of the rechargeable battery 100 may be deteriorated.

In accordance with the present example embodiment, the case where the first and the second terminals 130 and 140 are formed with copper will now be described with reference to FIG. 2 and FIG. 3.

A corrosion resistance member 150 may be installed between the first terminal 130 and the first fixture 121 in order to prevent galvanic corrosion. In an implementation, the corrosion resistance member 150 may be omitted from the second terminal 140, as the materials connected at the second terminal 140 may all be the same, e.g., copper or including copper. The corrosion resistance member 150 may have a tube portion 151, and a head portion 153 formed at the top end of the tube portion 151 and having a cross section larger than the tube portion 151. The first terminal 130 may have a first hole 132 at a central region for receiving the tube portion 151, and a second hole 134 communicating with the first hole 132 with a diameter greater than the first hole 132 to receive the head portion 153.

The corrosion resistance member 150 may have a hole 156, for receiving the first fixture 121, that is formed along the whole of the tube portion 151 and the head portion 153.

The pillar-shaped first fixture 121 may be inserted into the hole 156 and the cap plate 120, and pressed so as to form the top head 121b and the bottom head 121c.

The corrosion resistance member 150 may be formed of a material having an ionization tendency that is between that of the material for the first terminal 130 and that of the material for the first fixture 121. With a difference in ionization tendency between the first terminal 130 and the corrosion resistance member 150, as well as between the first fixture 121 and the corrosion resistance member 150, each being smaller than the difference in ionization tendency between the corrosion resistance member 150 and the first terminal 130, the galvanic corrosion occurring at the first terminal 130 and the corrosion resistance member 150 may be reduced.

In an implementation, taking as an example a case where the first terminal 130 is formed with copper and the first fixture 121 is formed with aluminum, the corrosion resistance member 150 may be formed with, e.g., nickel, stainless steel, nickel-plated copper, or a clad metal of Al—Cu, Ni—Cu, or Al—Ni, etc., having ionization tendencies between the copper and the aluminum metals. As particular examples, nickel and stainless steel are higher in ionization tendency than copper but lower than aluminum, and have excellent corrosion resistance.

As described above, with the present example embodiment, even in case the first terminal 130 and the first fixture 121 are formed with different materials, the galvanic corrosion occurring between the first terminal 130 and the first fixture 121 can be reduced. Furthermore, by forming the first terminal 130 and the first fixture 121 with different materials, it is possible to form the first terminal 130 and the second terminal 140 with the same material. This may substantially simplify the electrical connection of multiple batteries in a battery module.

FIG. 3 illustrates an enlarged view of the first terminal 130. It will be appreciated that the second terminal 140 can be formed using the same structures for preventing galvanic corrosion, if necessary or desired as a result of the materials used for the second terminal 140 and corresponding fixing member and electrode. Accordingly, a detailed description of such galvanic corrosion preventing structures will not be repeated for the second terminal 140.

Figure 4:
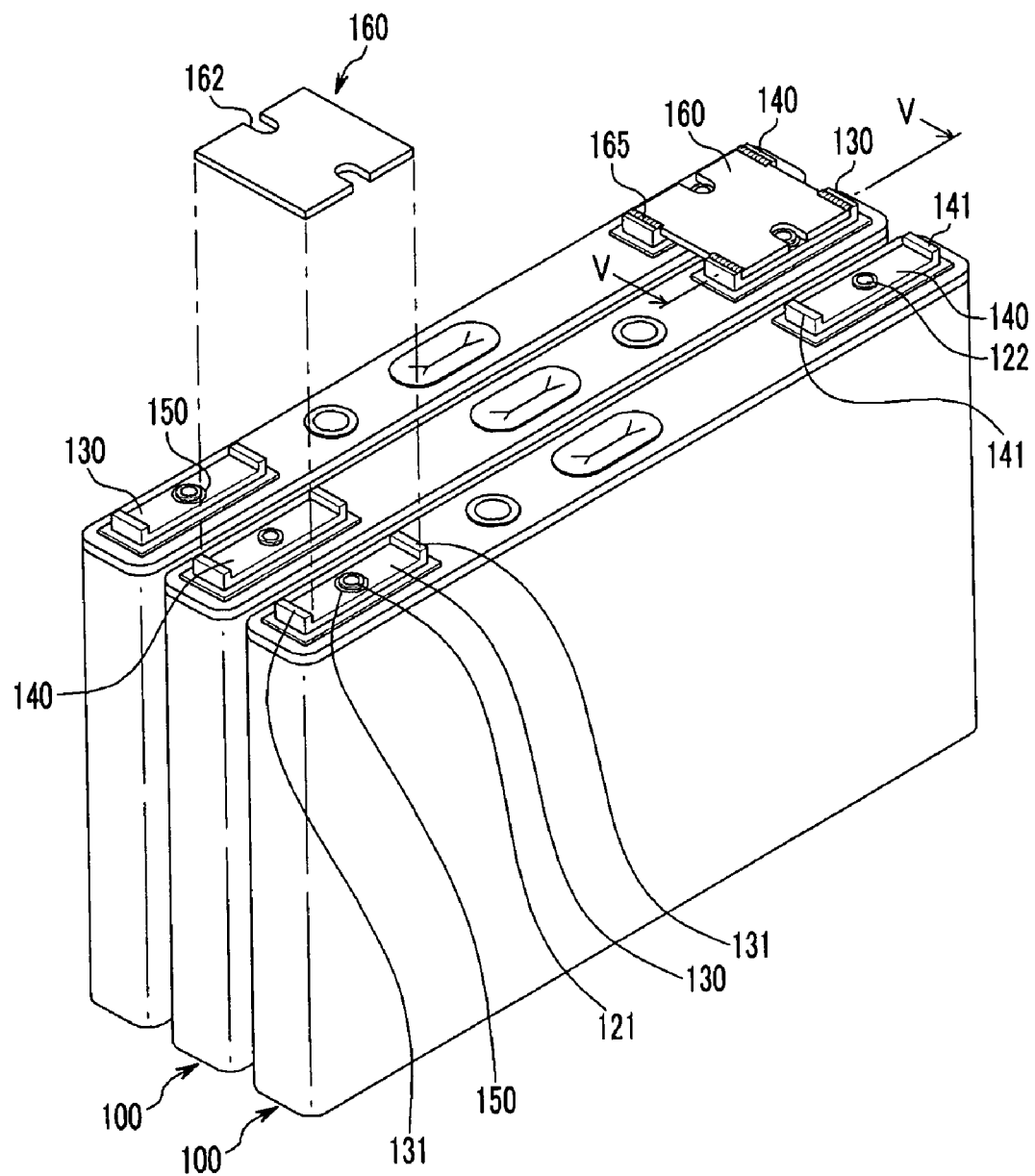
FIG. 4 illustrates an exploded perspective view of a battery module according to a second example embodiment.
Figure 5:
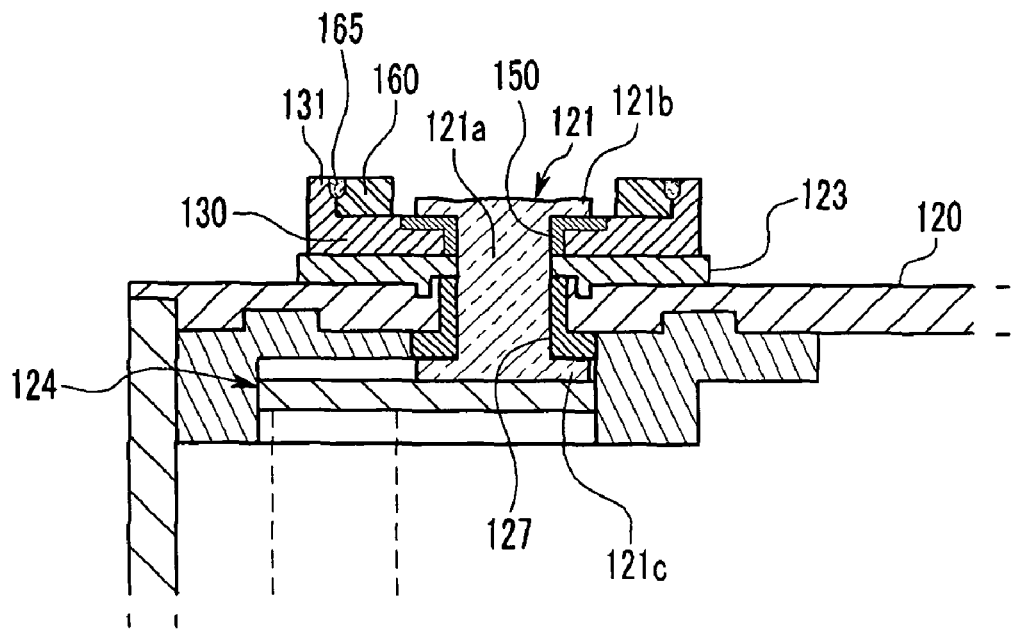
FIG. 5 illustrates a cross-sectional view of the battery module taken along the V-V line of FIG. 4.

FIG. 4 illustrates an exploded perspective view of a battery module according to a second example embodiment, and FIG. 5 illustrates a cross-sectional view of the battery module taken along the V-V line of FIG. 4.

Referring to FIG. 5, the battery module 200 according to the present example embodiment may include a plurality of rechargeable batteries 100. Respective connection members 160 may be used to electrically interconnect the rechargeable batteries 100. The rechargeable batteries 100 may be arranged in parallel as a stack of batteries. The rechargeable batteries 100 may be electrically coupled to each other in series by way of the connection members 160. In another implementation, the rechargeable batteries 100 may be electrically coupled to each other in parallel.

A high-capacity rechargeable battery module may be formed using a plurality of rechargeable batteries 100 electrically coupled to each other in series and/or parallel. The rechargeable batteries 100 may have a cylindrical shape, a prismatic shape, etc.

In the battery module, the connection members 160 may be attached to the positive and the negative terminals by way of resistance welding. Preferably, the positive and negative terminals are formed of a same material. For example, terminals 130 and 140 may each be, or may each include, copper. This may allow for a simple resistance welding process to be used, as it may be hard otherwise to weld dissimilar metals to each other where the positive and the negative terminals are formed with different materials. In this regard, if the connection member is formed with a material different from the positive and/or negative terminals, the melting points of the connection member and the positive and/or negative terminals may be different from each other so that it becomes hard to attach the connection member and the terminals to each other through welding. Further, if dissimilar metals contact each other, galvanic corrosion is more likely to occur between the dissimilar metals, and accordingly, the contact resistance between the dissimilar metals may increase.

In the battery module 200 according to the present example embodiment, the first and the second terminals 130 and 140 of the adjacent rechargeable batteries 100 may be disposed next to one another. Thus, the connection member 160 may be welded to the first terminal 130 of one rechargeable battery 100 and the second terminal 140 of the other rechargeable battery 100.

The connection member 160 may be generally plate-shaped. In an implementation, grooves 162 are formed at both ends of the connection member 160 in order to pass the top head portions 121b and 122b of the fixtures 121 and 122. The connection member 160 may be fitted between the protrusions 131 and 141 of the terminals 130 and 140. The protrusions 131 and 141 of the respective terminals 130, 140 and the connection member 160 may be welded to each other such that welded portions 165 are formed at the contact regions between the connection member 160 and the terminals 130 and 140. The connection member 160 may be formed with the same material as the terminals 130 and 140. For example, the connection member 160, the first terminal 130 of one battery and the second terminal 140 of the adjacent battery may each be, or may each include, copper. In an implementation, the terminals 130 and 140 may be copper, and the connection member 160 may also be copper. In another implementation, the terminals 130 and 140 may be aluminum, and the connection member 160 may also be aluminum.

In the present example embodiment, in case that the terminals 130 and 140 and the connection member 160 are formed with the same material, the connection member 160 may be easily attached to those terminals by way of laser welding or resistance welding. Furthermore, when the connection member 160 is formed with copper, having a high electrical conductivity and a low resistivity, the resistance may be reduced so that the total output of the battery module 200 is enhanced. When the connection member 160 and the terminals 130 and 140 are attached to each other by way of welding, the contact resistance between the terminals 130 and 140 and the connection member 160 may be prevented from increasing from impact or external vibration.

Figure 6:
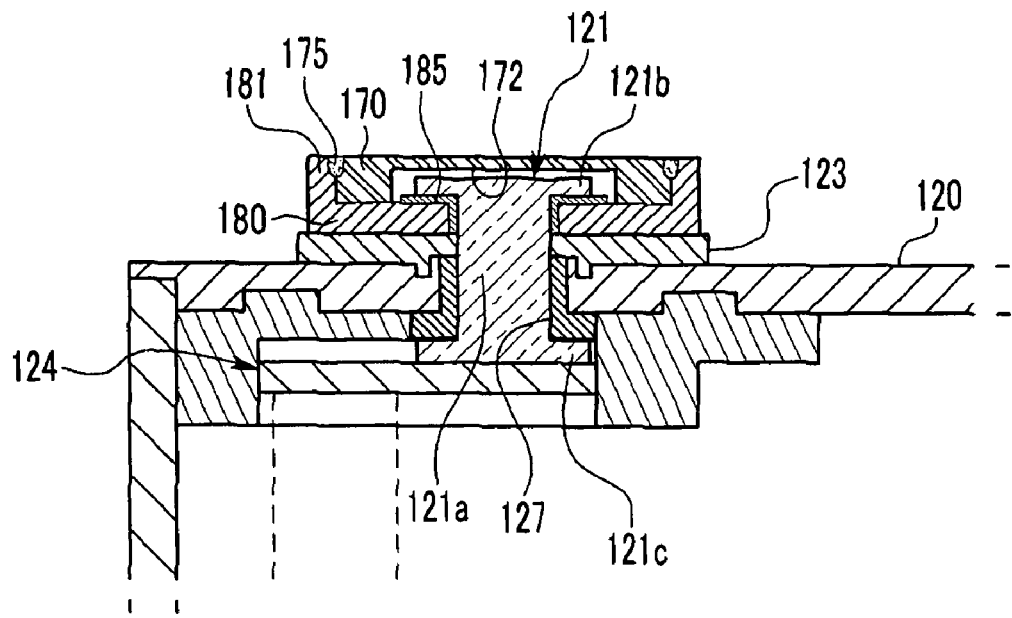
FIG. 6 illustrates a partial sectional view of a battery module according to a third example embodiment.

FIG. 6 illustrates a partial sectional view of a battery module according to a third example embodiment.

The battery module 400 according to the present example embodiment may include a plurality of rechargeable batteries 300, and respective connection members 170 electrically interconnecting the rechargeable batteries 300.

The battery module 400 according to the present example embodiment may have the same structure as the battery module 200 according to the first example embodiment except for the structure of a first terminal 180 and the connection member 170. Descriptions of same elements as the battery module 200 will not be repeated.

The first terminal 180 may be electrically connected to an electrode assembly 110 by way of the first fixture 121, e.g., a rivet, and fixed to the cap plate 120. The first fixture 121 may be electrically connected to the electrode assembly 110 via a first lead member 115.

As with the first example embodiment, the first terminal 180 of one rechargeable battery 300 and an adjacent second terminal 140 of the rechargeable battery 300 neighboring thereto may be electrically connected to each other by way of the connection member 170. The first terminal 180 and the second terminal 140 may be formed with the same material. For example, the first and second terminals 180, 140 may each be, or may each include, copper. The connection member 170 may be formed of the same material as the first and second terminals 180, 140. The connection member 170 may be fitted between protrusions 181 of the first terminal 180 and protrusions 141 of the terminals 180 and 140, and welded to the protrusions 181 and 141 of the second terminal and 140. Welded portions 175 may be formed at the contact regions between the terminals 180 and 140 and the connection member 170. A groove 172, e.g., a recess, may be formed at the bottom side of the connection member 170 in order to receive the top head 121b of the first fixture 121. The top surface of the groove 172 may cover the top head 121b.

The first terminal 180 may be plate-shaped, and protrusions 181 may be formed at both lateral ends of the first terminal 180. A corrosion resistance layer 185 may be formed, e.g., by a deposition process such as plating, at the contact area between the first terminal 180 and the first fixture 121. The deposition process may be, e.g., vapor deposition, sputtering, electroplating, electroless plating, etc. The corrosion resistance layer 185 may be formed with a material having an ionization tendency between that of the material for the first terminal 180 and the material for the first fixture 121.

With a difference in ionization tendency between the corrosion resistance layer 185 and the first terminal 180, and the difference in ionization tendency between the corrosion resistance layer 185 and the first fixture 121, each being smaller than the difference in ionization tendency between the first terminal 180 and the first fixture 121, the galvanic corrosion made at the first terminal 180 and the corrosion resistance plating layer 185 may be reduced.

In an implementation, the corrosion resistance layer 185 may be formed on the first terminal 180 by way of plating. Thus, a gap may be avoided between the first terminal 180 and the corrosion resistance layer 185, and, hence, galvanic corrosion made at the first terminal 180 may be further reduced. In an implementation, the corrosion resistance layer 185 may not be formed at the contact area between the connection member 170 and the first terminal 180. Accordingly, the connection member 170 and the first terminal 180 may contact each other directly, such that the resistance between the connection member 170 and the first terminal 180 may not be increased due to the corrosion resistance layer 185.

In a specific example according to the present embodiment, the first terminal 180 is formed with copper, the first fixture 121 is formed with aluminum, and the corrosion resistance layer 185 is formed with nickel, nickel having an ionization tendency between copper and aluminum. As nickel is greater in ionization tendency than copper but smaller than aluminum and has excellent corrosion resistance, it may reduce the occurrences of corrosion in a stable manner.

Example embodiments have been disclosed herein, and although specific terms are employed, they are used and are to be interpreted in a generic and descriptive sense only and not for purpose of limitation. For example, features have been described herein as being formed of a particular material relative to a material of an adjacent contacting feature. However, such particular materials may be a surface coating. For example, a connection member may have a coating of copper or a copper-containing alloy, rather than being formed of copper of the copper-containing alloy. Accordingly, it will be understood by those of ordinary skill in the art that various changes in form and details may be made without departing from the spirit and scope of the present invention as set forth in the following claims.

What is claimed is:

1. A battery, comprising:
a battery case;
an electrode assembly in the battery case, the electrode assembly including a first electrode;

a plate-shaped first terminal exposed to an exterior of the battery case, the first terminal being electrically connected to the first electrode;

a pillar-shaped first fixing member mechanically coupling the first terminal to the battery, the first fixing member forming at least part of an electrical path from the first terminal to the first electrode and being inserted into a hole in the first terminal, and a corrosion resistance member providing an electrical path from the first terminal to the first fixing member and being in direct contact with each of the first terminal and the first fixing member, wherein the corrosion resistance member prevents the first terminal from directly contacting the first fixing member.

2. The battery as claimed in claim 1, wherein:
the first terminal has a surface formed of a metal having a first ionization tendency,
the first fixing member has a surface formed of a metal having a second ionization tendency, and
the corrosion resistance member has a surface formed of a metal having a third ionization tendency that is between the first ionization tendency and the second ionization tendency.

3. The battery as claimed in claim 2, wherein the first terminal serves as a positive terminal.

4. The battery as claimed in claim 3, wherein the first terminal serves as a cathode terminal during discharge of the battery.

5. The battery as claimed in claim 2, wherein:
the metal forming the surface of the first terminal is copper, and
the metal forming the surface of the first fixing member is aluminum.

6. The battery as claimed in claim 5, wherein:
the first electrode includes aluminum, and
the first fixing member electrically contacts the first electrode.

7. The battery as claimed in claim 5, wherein the metal forming the surface of the corrosion resistance member is nickel, stainless steel, nickel-plated copper, or a clad metal of Al—Cu, Ni—Cu, or Al—Ni.

8. The battery as claimed in claim 2, wherein the first terminal serves as a negative terminal.

9. The battery as claimed in claim 8, wherein the first terminal serves as an anode terminal during discharge of the battery.

10. The battery as claimed in claim 8, wherein:
the metal forming the surface of the first terminal is aluminum, and
the metal forming the surface of the first fixing member is copper.

11. The battery as claimed in claim 10, wherein:
the first electrode includes copper, and
the first fixing member electrically contacts the first electrode.

12. The battery as claimed in claim 10, wherein the metal forming the surface of the corrosion resistance member is nickel, stainless steel, nickel-plated copper, or a clad metal of Al—Cu, Ni—Cu, or Al—Ni.

13. The battery as claimed in claim 1, wherein the corrosion resistance member is separate from the first terminal and the first fixing member.

14. The battery as claimed in claim 1, wherein the corrosion resistance member is integral with the first terminal.

15. The battery as claimed in claim 14, wherein the corrosion resistance member is a layer deposited on the first terminal.

16. The battery as claimed in claim 15, wherein the corrosion resistance member is a plating layer on the first terminal.

17. The battery as claimed in claim 1, wherein the electrode assembly further includes a second electrode and a separator, the separator separating the first electrode from the second electrode.

18. The battery as claimed in claim 1, wherein the first fixing member is a rivet.

19. The battery as claimed in claim 1, wherein the first fixing member is electrically connected between the first terminal and the first electrode.

20. A battery module, comprising:
a first battery; and
a second battery electrically connected to the first battery, each of the first and second batteries including:
a battery case,
an electrode assembly in the battery case, the electrode assembly including a first electrode,
a plate-shaped first terminal exposed to an exterior of the battery case, the first terminal being electrically connected to the first electrode,
a pillar-shaped first fixing member mechanically coupling the first terminal to the battery, the first fixing member forming at least part of an electrical path from the first terminal to the first electrode and being inserted into a hole in the first terminal, and
a corrosion resistance member providing an electrical path from the first terminal to the first fixing member and being in direct contact with each of the first terminal and the first fixing member,
wherein the corrosion resistance member prevents the first terminal from directly contacting the first fixing member.

21. The battery module as claimed in claim 20, wherein:
the first battery and the second battery are electrically connected to one another in series, the first terminals of the respective first and second batteries serving as positive terminals, and
the positive terminal of the first battery is electrically connected to a negative terminal of the second battery by a connection member that is welded to each of the positive terminal of the first battery and the negative terminal of the second battery.

22. The battery module as claimed in claim 21, wherein outer surfaces of the positive terminal of the first battery, the negative terminal of the second battery, and the connection member are each formed of a same metal.

23. The battery module as claimed in claim 22, wherein the first fixing member is a rivet, the rivet having an outer surface formed of a metal different from an outer surface of the positive terminals.

24. The battery module as claimed in claim 20, wherein the first fixing member is electrically connected between the first terminal and the first electrode.

* * * * *